Aug. 27, 1940.  A. E. DRISSNER  2,213,040

PROCESS OF MAKING PIPE PLUGS

Filed Nov. 8, 1938  4 Sheets-Sheet 1

INVENTOR.
Alfred E. Drissner
BY
ATTORNEY.

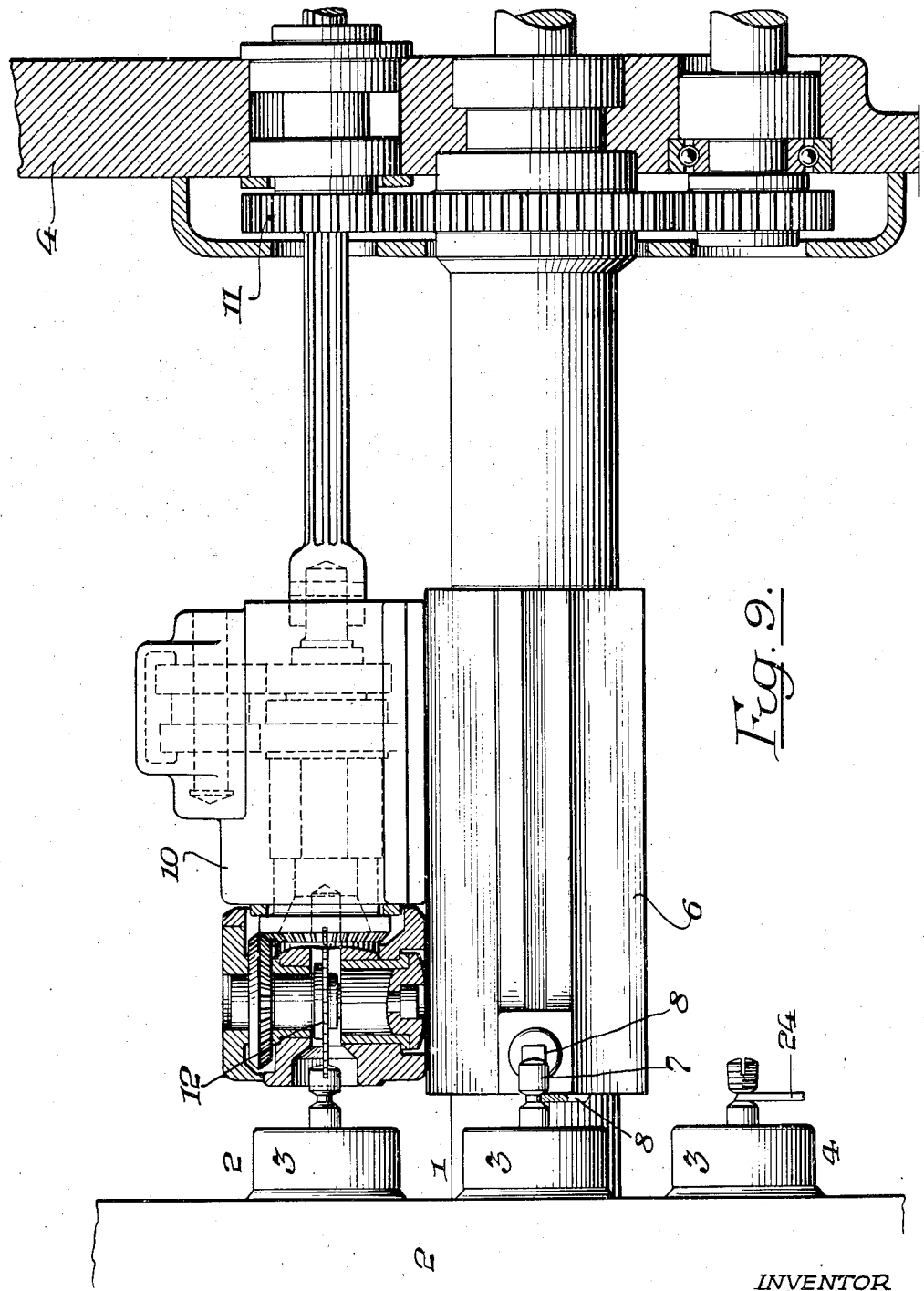

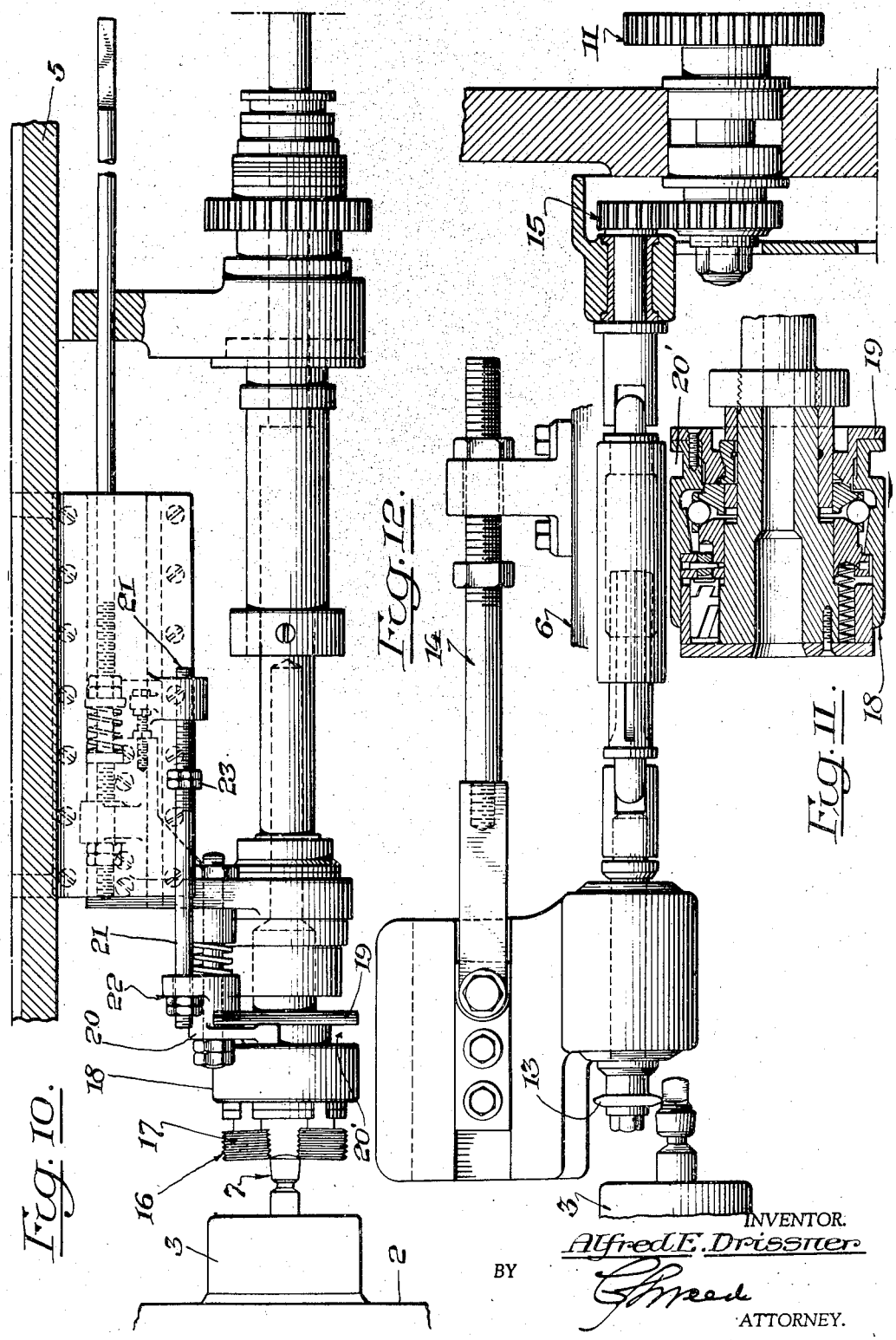

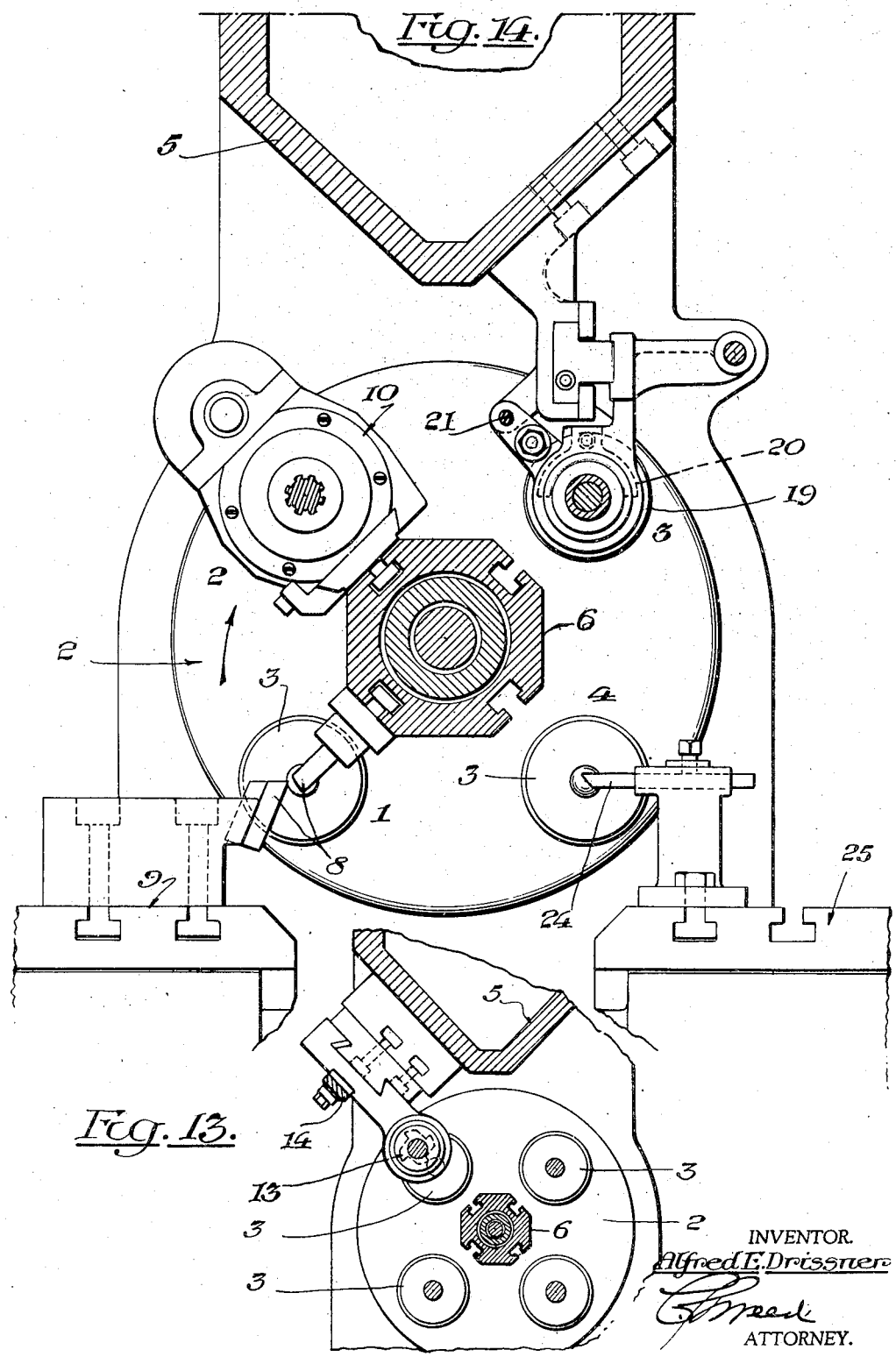

Patented Aug. 27, 1940

2,213,040

UNITED STATES PATENT OFFICE 2,213,040

PROCESS OF MAKING PIPE PLUGS

Alfred E. Drissner, Cleveland, Ohio, assignor to The National Acme Company, Cleveland, Ohio, a corporation of Ohio Application November 8, 1938, Serial No. 239,460

6 Claims. (Cl. 29—148)

This invention relates to the process of making tapered and threaded pipe plugs and similar articles, the object of the invention being completely to form such pipe plugs with a slotted or socketed head or an angular or squared end and thread the same from the larger to the smaller end thereof and to do this simply, expeditiously and inexpensively so that the plug is completely formed before it is cut from the bar, thus eliminating the expensive second step of slotting or forming the head after the threaded plug has been cut from the bar as heretofore, which second step usually costs several times the operation of threading the plugs.

It is the usual practice to thread from the smaller to the larger end of a piece of work but when this is done from a bar of stock, it is not possible to slot or socket the larger end until after the threading operation is completed and the part cut from the bar. Therefore, this has necessitated a second operation which, as before stated, is expensive. While threading from the larger to the smaller end of a few products has been done before but not with pipe plugs, in none of these instances has it been possible to form a slot or a square or angular socket in the larger end until after the piece has been cut from the bar.

Therefore, as hereinbefore stated, it is the object of the present invention to provide a process of forming tapered and threaded plugs while on the bar by slotting or forming the head thereof and threading the part from the larger to the smaller end all before the work is cut from its bar, thus avoiding operations on successive machines and to do this by sequential steps whereby successive tapered, threaded and completely formed plugs may be formed from the same bar of stock as it is fed into operative position, thus very materially reducing cost of operation and the product.

In the drawings accompanying and forming a part of this specification, Fig. 1 illustrates the formation of a plug while on its bar in readiness to have its head slotted.

Fig. 9 is a side view partly in section of a part of a multiple spindle bar machine in which a milling attachment for slotting the head is carried by the main tool slide of that machine, the several positions of the stock bar in the rotary spindles of the indexible work spindle carrier also being illustrated.

Fig. 10 illustrates a threading attachment suitably supported by the overhanging beam connecting the work spindle carrier and the gear carrier of the machine for threading the work from the larger to the smaller end.

Fig. 11 is a sectional view illustrating a threading die adapted for threading from the larger to the smaller end of the work.

Fig. 12 illustrates a square milling attachment also supported from the overhanging beam and fed into the work by means of a pusher from the main tool slide.

Figure 1:
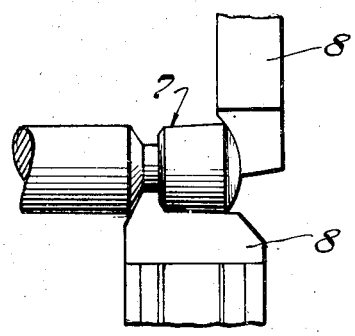
Figure 5:
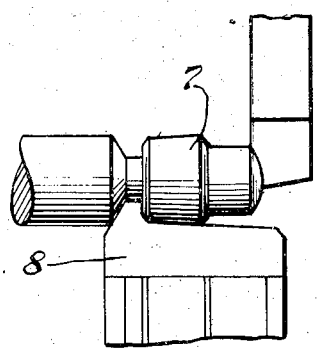
Fig. 5 illustrates the formation of a similar plug in readiness to have its head formed with a square or angular projection while on its bar.
Figure 2:
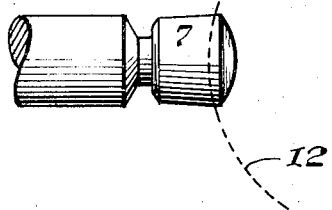
Fig. 2 illustrates the cutting of a slot in the head thereof while on its bar.

Fig. 13 is a partly cross-sectional view illustrating the position of the milling attachment shown in Fig. 12 when in position on the overhanging beam, and Fig. 14 is a cross-sectional view of a multiple spindle bar machine illustrating the sequential steps of forming the completed plug on its bar before it is cut therefrom; position 1 illustrates the formation of the plug by means of a suitable forming or side tool carried by a cross or transverse slide; position 2 illustrates a slotting attachment crried by the main tool slide for slotting the head of the plug before it is threaded. When, however, a square projecting end is to be formed, the milling attachment of Figs. 12 and 13 is substituted for the milling attachment shown in position 2 of Fig. 14 excepting that it is supported from the overhanging V-shaped beam in the manner shown; position 3 illustrates the threading of the previously slotted or angularly ended plug, and position 4 illustrates the cutting off of the plug from its bar after it is completely formed, the cutting tool being carried by a suitable cross or transverse slide.

Similar characters of reference indicate corresponding parts in the several views.

Before explaining in detail the present improvement and mode of operation thereof, I desire to have it understood that the invention is not limited to the details of construction and arrangement of parts illustrated in the accompanying drawings since the invention is capable of other embodiments, and that the phraseology employed is for the purpose of description and not of limitation.

It will be understood that the particular machine shown for carrying out this process has an indexible work spindle carrier 2 having therein a series of rotatable work spindles 3 for carrying the stock bars which are sometimes fifteen to twenty feet or more in length and a gear housing 4 connected by an overhanging beam 5 such as the V-shaped beam shown in Fig. 14, and a main tool slide 6 usually reciprocating toward and from the work spindle carrier.

Figure 6:
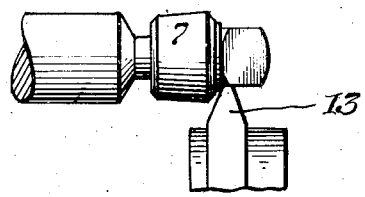
Fig. 6 illustrates the formation of the angular projection while the plug is still on its bar.
Figure 3:
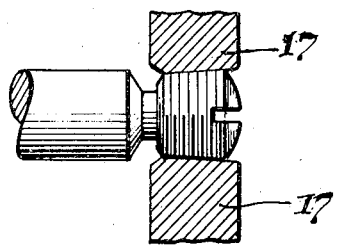
Fig. 3 illustrates the threading from the larger to the smaller end of the tapered plug while on its bar.
Figure 7:
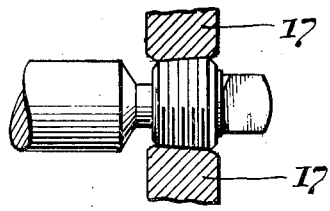
Fig. 7 illustrates the threading of this plug while on its bar.
Figure 4:
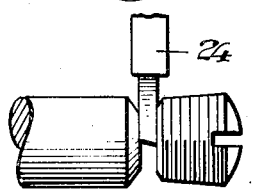
Fig. 4 illustrates the cutting off of the completely formed slotted and threaded plug from its bar.
Figure 8:
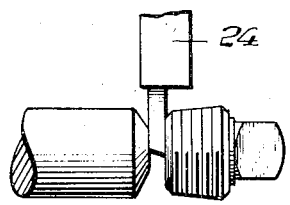
Fig. 8 illustrates the cutting off of the completed plug from its bar.

In carrying out this improved process, a stock bar having been fed into its proper position through the rotatable work spindle 3 of the indexible work spindle carrier 2, the end of the bar is first formed to provide a tapered plug 7 having a rounded head, this being done by suitable forming tools 8 usually carried by transverse or cross slides such as 9 (see Fig. 14), whereupon, after the formation of the tapered plug, it is indexed by the indexible spindle carrier to the second position where the formed end thereof is slotted by a suitable milling attachment 10 carried by the tool slide and movable back and forth therewith (see Fig. 14), this slotting or milling attachment rotating on the same center as the work and at the same speed and in the same direction as the work by suitable gearing 11 such as shown in Fig. 9 so that, during the forward movement of the tool slide, the slot will be cut by the rotary milling tool or saw 12. When, however, it is desired to form an angular or square end on the plug, instead of slotting it, the milling attachment 13 shown in Figs. 12 and 13 is substituted for the saw shown in Fig. 6 in which instance, however, the milling attachment is carried by the overhanging V-shaped beam 5 which connects the gear housing 4 and spindle carrier 2. In this instance, the center of the cutter is set at the proper position from the center of the work and the cutter is rotated on this center in the opposite direction from the work, the cutter being fed into the work by means of a suitable pusher 14 connected with the main tool slide 6 and rotated by suitable gearing 15 from the gear housing.

After the head has been completely formed either by slotting it or by forming a square or angular end thereon and it will be understood that a square socket could be formed instead of the square end by a suitable tool if desired, the plug is carried into the 3rd position by the indexible spindle carrier (see Fig. 14) and is then threaded from the larger to the smaller end thereof.

A suitable threading die mechanism 16, such as shown in Figs. 10 and 11 is used for this purpose and this threading die is suitably supported by the V-shaped beam 5 (see Figs. 10 and 14) at the opposite side from the slotting attachment 10 or milling attachment 13.

This threading die is suitably operated so that the cutters or chasers 17 will be gradually contracted so as to thread the work from the larger to the smaller end and be released at the proper time and for this purpose, the shell 18 of the die is provided with an internal taper so that when the chaser starts to cut, the yoke 19 of the die is stopped and prevented from moving forward toward the work by means of a die fork 20 fitting into a groove 20' of the yoke. This die fork is carried on a rod 21 secured to the machine frame, the nuts 22 stopping the movement of the yoke in one position and the nuts 23 resetting the die at the proper time.

After the plug has been threaded from its larger to its smaller end, it is carried by the indexible work spindle carrier into the 4th position (see Fig. 14) where, by means of the cutting off tool 24 carried by a cross or transverse slide 25 mounted at the opposite side of the machine, it is cut from the stock bar completely formed whereupon the stock bar is again fed through its work spindle into the 1st position and by a similar series of sequential steps another plug is formed at the rate of many per minute whereby the necessity of removing the threaded plug and placing it in another machine to slot or form its head is avoided.

It is to be understood that, by describing in detail herein any particular form, structure or arrangement, it is not intended to limit the invention beyond the terms of the several claims or the requirements of the prior art.

Having thus explained the nature of my said invention and described a way of constructing and using the same, although without attempting to set forth all of the forms in which it may be made or all of the modes of its use, I claim:

1. The process of completely forming a threaded pipe plug on its stock bar which consists in first forming a tapered plug on the end of the bar and tapered outwardly from the bar, then slotting or forming an angular portion on the head of the plug, then threading the plug toward the stock bar from its larger to its smaller end while on its bar, and then cutting it from the bar.

2. The process of making threaded and tapered pipe plugs which consists in first forming on its stock bar a tapered plug with a head or projection and tapered outwardly from the bar to the head, then milling an angular portion or slot in such head, then threading the plug toward the stock bar from its larger to its smaller end while on its bar, and then cutting the plug completely formed from its bar.

3. The process of making tapered and threaded plugs which consists in first forming on its stock bar a tapered plug with a head at its larger end, then indexing the bar and its plug into a different position, then milling an angular portion or slot on its head, then indexing the plug into a different position, then threading the plug from its larger to its smaller end, then indexing the plug into a different position, and then cutting it completely formed from the bar.

4. The process of making threaded and tapered plugs which consists in first forming on its stock bar a tapered plug with a head and tapered outwardly from the bar to the head, then forming said head to provide it with means for manipulating the plug, then threading the plug from its larger end toward the stock bar, and then cutting it from the bar completely formed.

5. The process of making threaded pipe plugs which consists in forming on its stock bar a tapered plug with a head and tapered outwardly from the bar to the head, forming a slot in its head and threading the plug toward the stock bar from its larger to its smaller end while on its bar, and cutting it from the bar.

6. The process of making threaded pipe plugs which consists in forming on its stock bar a tapered plug with a head and tapered outwardly from the bar to the head, forming an angular portion on its head and threading the plug toward the stock bar from its larger to its smaller end while on its bar, and cutting it from the bar.

ALFRED E. DRISSNER.